Dec. 2, 1969  S. B. TOPF  3,481,242
ONE PIECE EXPANSION FASTENER
Filed June 6, 1968  2 Sheets-Sheet 1
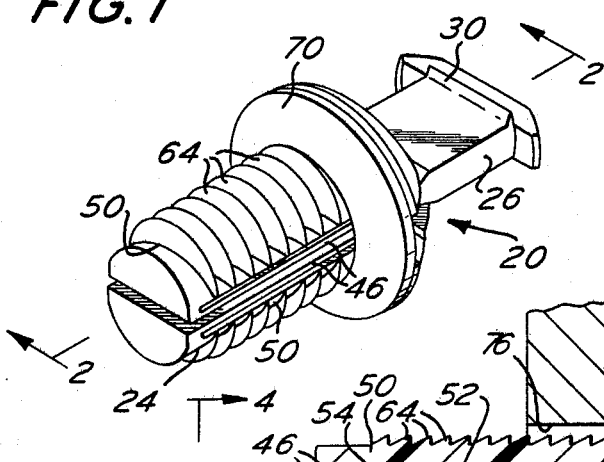
FIG. 1
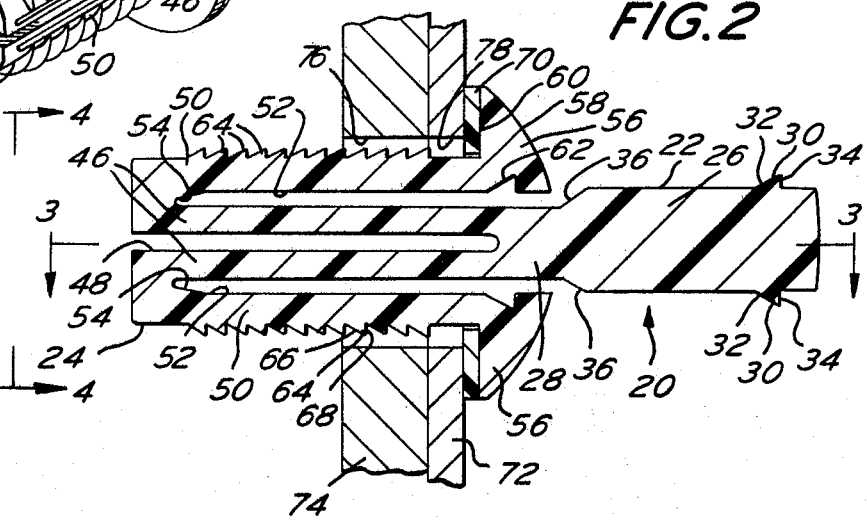
FIG. 2
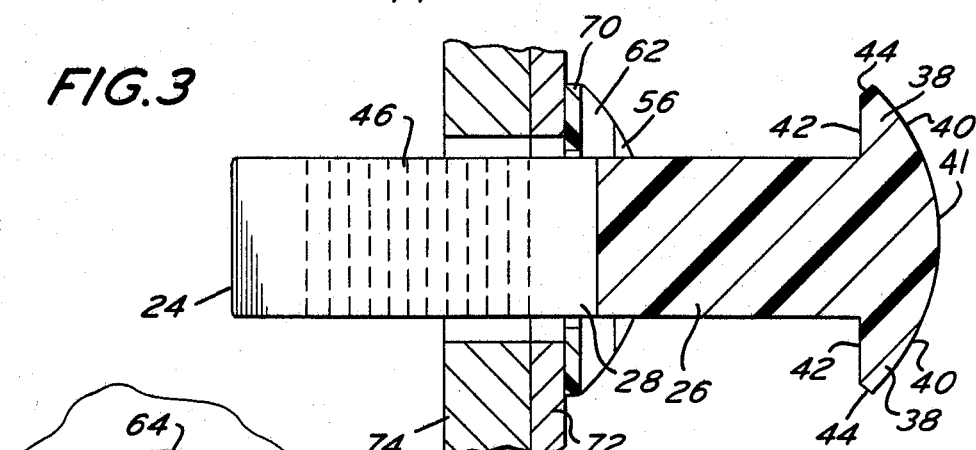
FIG. 3
FIG. 4
INVENTOR
SAMUEL B. TOPF
BY
Caesar, Rivise,
Bernstein & Cohen
ATTORNEYS.

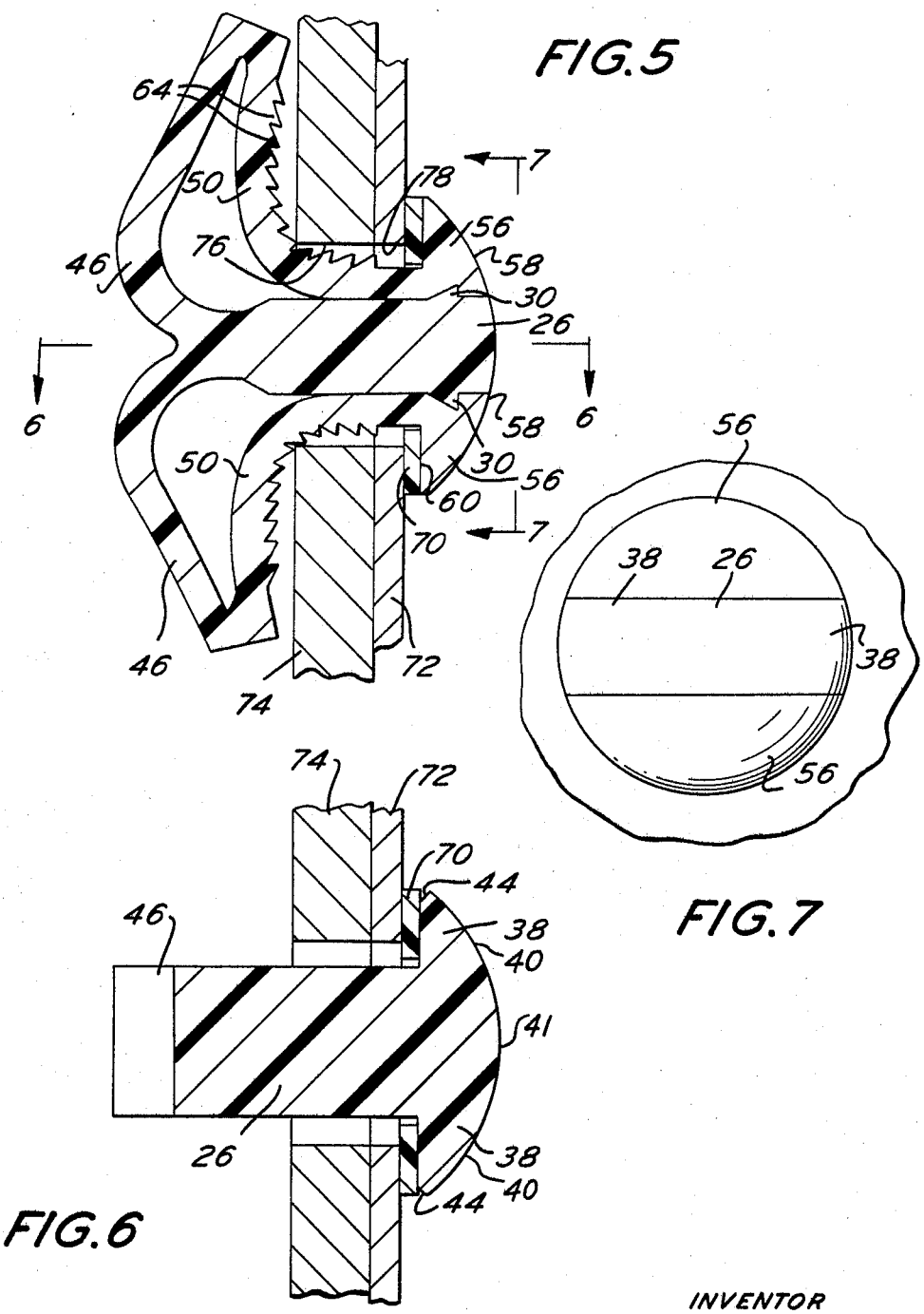

United States Patent Office 3,481,242
Patented Dec. 2, 1969

3,481,242
ONE PIECE EXPANSION FASTENER
Samuel B. Topf, 3925 Riviera Drive,
Coral Gables, Fla. 33160
Filed June 6, 1968, Ser. No. 735,020
Int. Cl. F16b 19/04
U.S. Cl. 85—37         6 Claims

ABSTRACT OF THE DISCLOSURE

An expansion fastener for insertion in a wall having an opening therein. The fastener comprises an elongated stud member and an integral body member. The stud member has an outer head portion and an inner bifurcated portion. The body portion comprises a pair of legs each of which is secured at its innermost end to the innermost end of one of the tines of the bifurcated portion of the stud member. The other end of the legs each includes a shoulder member. The head of the stud member and the shoulders include means for locking the head between the shoulder. Each of the legs further includes a plurality of laterally projecting teeth. The teeth extend outwardly of the legs to grip the wall about said opening to prevent removal of the fastener from the opening when the head is locked between the shoulders.

---

This invention relates generally to fasteners and more particularly to an anchoring device of unitary construction.

This invention is an improvement over my invention in an one piece plastic expansion fastener which is shown and described in United States Patent No. 3,350,976 which issued Nov. 7, 1967.

The expansion fastener disclosed in said application has proved to be a valuable fastener and completely effective for its intended purpose. However, where the expansion fastener is constantly inserted and removed, there is a possibility that a leg of the fastener will crack. That is, the legs of the one piece plastic expansion fastener have serrations therein which enable gripping of the wall of the hole in which the expansion fastener is placed. It has been found that the serrations which enable firmer gripping of the expansion fastener when the expansion fastener is expanded in an opening tend to weaken the one piece plastic expansion fastener structurally. Thus, the legs are weakened at the position of the serrations so that after continued reuse of the plastic expansion fastener, there is a tendency of the expansion fastener to break at the serrations. It has also been found that it is possible that the one piece plastic expansion fastener will be difficult to use in a hole that is too large or irregular. That is, where the hole is irregular or more than slightly larger than the outside diameter of the one piece plastic expansion fastener, the plastic expansion fastener has a tendency to be pulled out of the hole because the locking means between the shoulders of the legs and the head of the fastening member fails to stay locked.

It is therefore an object of this invention to overcome the aforementioned disadvantages.

Another object of the invention is to provide a new and improved one piece expansion fastener which effectively secures an external member to a wall.

Another object of the invention is to provide a new and improved one piece expansion fastener which has good gripping surfaces yet which is not destroyed after only a few uses.

Yet another object of the invention is to provide a new and improved expansion fastener having a means for reducing the tolerance of the opening in which the expansion fastener is placed.

Another object of the invention is to provide a new and improved expansion fastener having a washer placed thereabout in order to secure said fastener to a wall having an irregular opening therein.

These and other objects of the invention are achieved by providing an expansion fastener for insertion in a wall having an opening therein, said fastener comprising an elongated stud member and an integral body member. The stud member has an outer head portion and an inner bifurcated portion. The body portion comprises a pair of legs, each of said legs being secured at its innermost end to one of the tines of said bifurcated portion of the stud member. The other ends of the legs each include a shoulder member. The shoulder members and the head of the stud member include means for locking the head portion between the shoulders. Each of the legs further includes a plurality of laterally projecting teeth. The teeth extend outwardly of the legs to grip the wall in said opening to prevent the removal of the fastener from the opening when the head is locked between the shoulders.

Other objects and many of the attendant advantages of this invention will be readily appreciated as the same becomes better understood by reference to the following detailed description when considered in connection with the accompanying drawings wherein:

FIG. 1 is a perspective view of an expansion fastener embodying the invention;

FIG. 2 is an enlarged sectional view of the fastener taken along the line 2—2 in FIG. 1 with the fastener shown inserted in a wall which is illustrated in vertical section, FIG. 3 is a sectional view taken along the line 5—5 in FIG. 2;

FIG. 4 is a side elevational view taken along the line 4—4 in FIG. 2;

FIG. 5 is a sectional view similar to FIG. 2 with the expansion fastener shown in its locked position;

FIG. 6 is a sectional view taken along the line 6—6 in FIG. 5; and

FIG. 7 is a side elevational view taken along the line 7—7 in FIG. 5.

Referring now in greater detail to the various figures of the drawing wherein similar reference characters refer to similar parts, an expansion fastener embodying the invention is shown generally at 20 in FIG. 1.

As best seen in FIG. 2, the expansion fastener 20 is preferably comprised of a stiff resilient material such as nylon and basically comprises a stud member 22 and a body member 24. The stud member 22 is elongated and includes an outer head portion 26 and an inner bifurcated portion 28.

The head portion 26 is thicker than the bifurcated portion 28 and includes a pair of triangularly shaped vertically extending projections 30. As will hereinafter be seen, the projections 30 are a portion of the locking member between the stud member and the body member. The projections 30 each include inclined planar surfaces 32 which facilitate the fastening member being slid into the body member 24. The projections 30 also include planar surfaces 34 which extend transversely to the head portion of the stud member and which act as shoulders to retain the stud member within the body member 24.

At the innermost ends of the head portion 26 are a pair of inwardly tapered planar surfaces 36 which further facilitate the insertion of the stud member 22 into the body member 24. As best seen in FIG. 3, the outermost end of the head 26 a pair of laterally extending projections 38 are provided. The projections 38 each include an arcuate outer surface 40 which are connected by an arcuate central surface 41 and a planar inner surface 42.

Each of the projections 38 is inwardly bevelled at surface 44 to enable a prying tool to be inserted thereunder in order to extract a fastener from a wall. The arcuate surfaces 40 and 41 of the head portion 26 enable the head portion to form a generally smooth head for the fastener when it is secured in the wall.

The bifurcated portion 28 includes a pair of longitudinally extending tines 46 which extend parallel to each other and are separated by a slot 48 which extends to the innermost end of the fastener 20. Each of the tines 46 is substantially planar.

The body member 24 basically comprises a pair of longitudinally extending legs 50 which extend parallel to tines 46 of the inner bifurcated member 28. The legs 50 are spaced from the tines by longitudinally extending slots 52. As best seen in FIG. 2, each slot 52 is tapered at the inner most end of the fastener 20 at 54. The tapered portion of the slot 52 provides more material in each of the legs 50 to inhibit cracks in the legs 50 when they are bent.

As best seen in FIG. 4, each of the legs 50 are of generally semi-circular cross-section. The legs 50 extend parallel to each other and thus form a generally cylindrical shaft when the fastener 20 is not in a locked position.

At the outermost end of each of the legs 50, an outwardly extending shoulder 56 is provided. As best seen in FIGS. 6 and 7, the shoulders 56 are substantially semicircular. The outer surface 58 of the shoulders is arcuately shaped and the inner surface 60 thereof is substantially planar. Surface 60 extends transversely to the leg 50. The shoulders bear against the outer surface of the object secured by fastener 20 and allow only the legs 50 of the fastener to enter an opening.

There is also provided in the lateral surfaces of shoulders 56 triangularly shaped notches 62 which are complementary to the projections 30 of the head portion 26 of the stud member 22. Each notch 62 communicates with slot 52 and is adapted to receive the projection 34 to lock the head portion 26 between the shoulders 56 of the body portion 24.

A plurality of laterally projecting teeth 64 are provided along the length of the legs 50 of the body member 24. As best seen in FIG. 4, each of the teeth 64 is crescent shaped and projects outwardly of the legs 50. As best seen in FIG. 2, the innermost surfaces 66 of the teeth 64 are tapered inwardly so that the body member is easily slipped into an opening provided therefor in a wall or plate. The outermost surfaces 68 of the teeth extend transversely to the legs 50 to act as gripping shoulders when the fastener is in a locked position.

As best seen in FIGS. 1 and 2, the teeth 64 are formed integrally yet externally of the legs 50. The teeth are not formed by removing material from the legs but rather by adding material to the legs. Thus, there are no structurally weakened portions in legs 50 due to the addition of the teeth 64 to the legs. Thus, the tendency for cracking to occur at weakened portions of the leg is eliminated.

A planar circular washer 70 having a central circular opening is provided which is telescoped over the body member 24 and is located adjacent the shoulders 56 of the legs 50. As best seen in FIG. 2, the opening in washer 70 is slightly larger than the combined maximum thickness of the head portion 26 and the legs 50.

The fastener 20 is suitably used to secure a first member to a second member. As seen in FIG. 2, the fastener 20 is shown in the initial step of securing a planar member 72 to a wall or plate 74 having opposed surfaces. The wall 74 includes a longitudinally extending opening 76. Similarly, planar member 72 includes a longitudinally extending opening 78. The openings of the member 72 and the wall 74 are aligned and the fastener 20 is inserted therein with the legs 50 of the body member being inserted through the openings.

A hammer or other suitable tool is then used to strike the outermost surface 41 of the head portion 26 of the elongated stud member 22 which drives the head portion inwardly of the body member 24.

As the head portion 26 of the stud member 22 is driven inwardly of the body member 24, the tines 46 are caused to separate by the legs 50 which are stationary. That is, the shoulder members 56 of the leg members 50 bear against the washers 70 which in turn bear against the outer surface of the planar member 72. Thus, the legs 50 are stationary. Tines are thus drawn outwardly by the legs 50 which are deformed to follow the tines 46. The teeth 64 dig into the wall 74 about the openings 76.

As the head portion 22 slides between the shoulders 56, the shoulders 56 are urged apart as the projections 30 of the head portion 26 reach the body portion 24 of the fastener. Thus, until the projections 30 are aligned with notches 62, the shoulders are urged apart by the projections 30 bearing against the inner surfaces of the shoulders. When the projections 30 of the head member 26 are aligned with the notches 62 in the shoulders 56 of the legs 50, the shoulders return to their original position and the head portion 26 is locked between the shoulders as the shoulder surfaces 34 of the projections 30 prevent removal of the projections from the notches of the projections 30.

As best seen in FIG. 5, the flared legs 50 prevent removal of the fastener by bearing against the inner surface of the wall 74. The wall or plate 74 and the planar member 72 are thereby secured to each other and are maintained between the shoulders 56 and the projections 38 of the head portion and the legs 50 of the fastener.

As best seen in FIG. 7, the head of the fastener 20 is formed by the head portion 26 of the stud member and the shoulders 56 of the body member which thereby forms a smooth circular head.

In order to remove the fastener and thereby separate the planar member 72 and the wall or plate, 74, a prying tool is applied to the bevelled surface 44 of the projections 38 of head portion 26 and the head portion is pried out from between the shoulders 56 of legs 50. The resilience of the material comprising the fastener enables the projections 30 to be pulled out from the notches 62. The head portion 26 is thus drawn outwardly of the body member 24 and the legs 50 are drawn together as tines 46 are pulled out of the wall or plate 74. The fastener is thus drawn to the position shown in FIG. 3 and the entire fastener 20 is then slid longitudinally out of the opening.

Where the opening 76 in the planar wall 74 is not uniformly circular such as in mortar or plastic walls, the washer 70 prevents the fastener 20 from coming apart inadvertently. That is, where the opening is not substantially the same diameter as the outer diameter of the fastener 20, the fastener can come apart if the shoulders 56 are spaced too far apart. Thus, the notches 62 can release the projections 34 and the resiliency of the material comprising the fastener cause the head portion 26 to be urged outwardly of the body member. Thus, by providing the washer 70, the maximum spacing of the shoulders 56 is limited by the diameter of the opening in washer 70. Thus even in a loose or non-uniform hole, the fastener 20 cannot be inadvertently loosened as a result of the shoulders being separated too far.

The use of outwardly projecting teeth 64 obviates the need for serrations which weaken the legs at the serration. Therefore, the fastener 20 can be used over and over again without cracking the legs of the fastener as a result of weakened portions therein.

Without further elaboration, the foregoing will so fully illustrate my invention that others may be applying current or future knowledge, readily adapt the same for use under various conditions of service.

What is claimed as the invention is:

1. An expansion fastener for insertion in a wall having opposed surfaces and an opening therein, said fastener comprising an elongated stud member and an integral body member, said stud member having an outer head portion and an inner bifurcated portion, said body portion comprising a pair of legs, each of said legs being secured at its innermost end to the innermost end of one of the tines of said bifurcated portion of said stud member, the other ends of said legs each including a shoulder member, said shoulder members and said head of said stud member including means for locking said head between said shoulders, said locking means comprising laterally extending projections secured to said head portion of said stud member and inwardly extending recesses in said shoulders, said projections each including an inclined surface and a surface which extends transversely to said stud member and faces outwardly of said fastener, said recesses being complementary to said projections and aligned with said projections when said head portion is urged inwardly of said shoulders, each of said legs further including a plurality of laterally projecting teeth, said teeth extending outwardly of the outer surface of said legs to grip said wall about said opening to prevent removal of said fastener from said opening when said head is locked between said shoulders.

2. The invention of claim 1 and further including a washer having a circular opening therein which is slightly larger in diameter than the combined thickness of said stud member and said legs, said washer being provided adjacent said shoulders about said legs so that said fastener remains secured in an irregular opening.

3. The invention of claim 1 wherein said head and said shoulders each include an arcuate outer surface, said head fitting between said shoulders to provide a smooth outer head after said fastener is secured in said opening.

4. The invention of claim 1 wherein said head portion of said stud member includes outwardly extending projections, said outwardly extending projections having inwardly bevelled edges to enable prying means to be inserted thereunder for detaching said fastener for removal from said opening in said wall.

5. An expansion fastener for insertion in a wall having an opening therein, said expansion fastener comprising an elongated stud member and an integral body member, said stud member being elongated and slidable within said body member and including an outer head portion, said body member comprising a pair of legs, each of said legs including a shoulder member, said fastener including means for locking said head between said shoulder, said locking means comprising laterally extending projections secured to said head portion of said stud member and inwardly extending recesses in said shoulders, said projections each including an inclined surface and a surface which extends transversely to said stud member and faces outwardly of said fastener, said recesses being complementary to said projections and aligned with said projections when said head portion is urged inwardly of said shoulders, said shoulder members extending outwardly of said legs to prevent insertion of said shoulders into said opening and a washer, said washer having a circular opening which is slightly larger in diameter than the combined maximum thickness of said stud member and said legs, said washer being placed over said legs adjacent said shoulders of said legs so that said head remains locked between said shoulders.

6. The invention of claim 5 wherein said head portion includes an inner bifurcated portion and said legs of said body portion are secured to their innermost end to the innermost end of the tines of said bifurcated portion of said stud member.

References Cited

UNITED STATES PATENTS

| | | | |
|---|---|---|---|
| 921,037 | 5/1909 | Whitner | 85—87 |
| 3,188,905 | 6/1965 | Millet | 85—84 |
| 3,213,746 | 10/1965 | Dwyer | 85—80 |
| 3,279,643 | 10/1966 | Amesbury et al. | 85—82 |
| 3,350,976 | 11/1967 | Topf | 85—37 |

FOREIGN PATENTS

| | | |
|---|---|---|
| 1,335,358 | 7/1963 | France. |
| 667,637 | 7/1963 | Canada. |

EDWARD C. ALLEN, Primary Examiner